(12) United States Patent
Mackenzie et al.

(10) Patent No.: US 11,589,269 B2
(45) Date of Patent: Feb. 21, 2023

(54) MOBILE COMMUNICATIONS NETWORK

(71) Applicant: British Telecommunications Public Limited Company, London (GB)

(72) Inventors: Richard Mackenzie, London (GB); Zaid Al-Daher, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/085,257

(22) PCT Filed: Mar. 29, 2017

(86) PCT No.: PCT/EP2017/057470
§ 371 (c)(1),
(2) Date: Sep. 14, 2018

(87) PCT Pub. No.: WO2017/167835
PCT Pub. Date: Oct. 5, 2017

(65) Prior Publication Data
US 2019/0075494 A1    Mar. 7, 2019

(30) Foreign Application Priority Data
Mar. 31, 2016    (EP) .................................... 16163458

(51) Int. Cl.
*H04W 36/00* (2009.01)
*H04W 72/00* (2009.01)
(Continued)

(52) U.S. Cl.
CPC ....... *H04W 36/0007* (2018.08); *H04L 1/0026* (2013.01); *H04W 4/06* (2013.01);
(Continued)

(58) Field of Classification Search
CPC . H04W 36/0007; H04W 88/06; H04W 36/30; H04W 28/0231; H04W 28/0273;
(Continued)

(56) References Cited

U.S. PATENT DOCUMENTS 7,363,039 B2    4/2008   Laroia et al.
7,885,235 B2    2/2011   Mochizuki et al.
(Continued)

FOREIGN PATENT DOCUMENTS

CN    101331779 A    12/2008
CN    101584175 A    11/2009
(Continued)

OTHER PUBLICATIONS

3GPP TR 23.768 V12.1.0 (Jun. 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.
(Continued)

*Primary Examiner* — Sharmin Chowdhury
(74) *Attorney, Agent, or Firm* — Patterson Thuente, P.A.

(57) ABSTRACT

A base station for communication with a plurality of mobile terminals in a mobile communications network is disclosed. The base station includes a plurality of transmitters, in which each transmitter is configured to provide a transmit radio signal to a distinct space when compared to the other transmitters. A first transmitter is configured to provide to a first space, a transmit radio signal carrying a multicast service. A second transmitter is configured to provide to a second space, distinct from the first space, a transmit radio signal carrying a unicast service, and the second space shares a first boundary with the first space.

14 Claims, 4 Drawing Sheets

(51) Int. Cl.
    *H04W 76/27*         (2018.01)
    *H04L 1/00*          (2006.01)
    *H04W 4/06*         (2009.01)
    *H04W 24/08*        (2009.01)
    *H04W 28/02*        (2009.01)
    *H04W 36/30*        (2009.01)
    *H04W 88/06*        (2009.01)
    *H04B 17/318*       (2015.01)
    *H04W 24/10*        (2009.01)

(52) U.S. Cl.
    CPC ....... *H04W 24/08* (2013.01); *H04W 28/0231* (2013.01); *H04W 28/0273* (2013.01); *H04W 28/0284* (2013.01); *H04W 36/30* (2013.01); *H04W 72/005* (2013.01); *H04W 76/27* (2018.02); *H04W 88/06* (2013.01); *H04B 17/318* (2015.01); *H04W 24/10* (2013.01)

(58) Field of Classification Search
    CPC ... H04W 28/0284; H04W 24/08; H04W 4/06; H04W 76/27; H04W 72/005; H04W 24/10; H04L 1/0026; H04B 17/318
    See application file for complete search history.

(56) References Cited

U.S. PATENT DOCUMENTS

| | | | |
|---|---|---|---|
| 8,554,211 B2 | 10/2013 | Angelow | |
| 8,588,171 B2 | 11/2013 | Fukuoka et al. | |
| 8,644,261 B1 | 2/2014 | Vargantwar et al. | |
| 9,001,737 B2 | 4/2015 | Amerga et al. | |
| 9,030,988 B2 | 5/2015 | Sayeed et al. | |
| 9,191,922 B2 | 11/2015 | Anchan et al. | |
| 9,380,526 B2 | 6/2016 | Koivisto et al. | |
| 9,439,171 B2 | 9/2016 | Phan et al. | |
| 9,648,584 B2 | 5/2017 | Hiben et al. | |
| 9,723,523 B2 | 8/2017 | Purnadi et al. | |
| 9,763,151 B2 | 9/2017 | Kim | |
| 9,820,259 B2 | 11/2017 | Wang et al. | |
| 9,826,502 B2 | 11/2017 | Cherian et al. | |
| 9,860,935 B2 | 1/2018 | Teyeb et al. | |
| 10,070,413 B2 | 9/2018 | Phan et al. | |
| 10,075,883 B2 | 9/2018 | Zhao et al. | |
| 10,084,581 B2 | 9/2018 | Sun | |
| 10,219,245 B2 | 2/2019 | Prasad et al. | |
| 10,231,174 B2 | 3/2019 | Byun et al. | |
| 10,277,416 B2 | 4/2019 | Zhu et al. | |
| 10,299,182 B2 | 5/2019 | Nagasaka et al. | |
| 10,419,893 B2 | 9/2019 | Åkesson et al. | |
| 10,492,239 B2 | 11/2019 | Fujishiro et al. | |
| 10,530,595 B2 | 1/2020 | Zhu et al. | |
| 10,728,714 B2 | 7/2020 | Al-Daher et al. | |
| 2002/0067909 A1 | 6/2002 | Iivonen | |
| 2002/0112244 A1 | 8/2002 | Liou et al. | |
| 2004/0106412 A1* | 6/2004 | Laroia .................. | H04W 16/12 455/448 |
| 2007/0135170 A1* | 6/2007 | Khan .................. | H04B 7/0491 455/562.1 |
| 2007/0168523 A1 | 7/2007 | Jiang et al. | |
| 2008/0002691 A1 | 1/2008 | Qi et al. | |
| 2008/0132263 A1 | 6/2008 | Yu et al. | |
| 2008/0267317 A1 | 10/2008 | Malladi et al. | |
| 2009/0175183 A1 | 7/2009 | Mochizuki et al. | |
| 2009/0274453 A1 | 11/2009 | Viswambharan et al. | |
| 2010/0035627 A1 | 2/2010 | Hou et al. | |
| 2010/0077441 A1 | 3/2010 | Thomas et al. | |
| 2010/0216454 A1 | 8/2010 | Ishida et al. | |
| 2011/0032832 A1* | 2/2011 | Jalali .................. | H04L 65/4076 370/252 |
| 2011/0305184 A1 | 12/2011 | Hsu et al. | |
| 2012/0269075 A1 | 10/2012 | Fernandes et al. | |
| 2013/0028118 A1* | 1/2013 | Cherian .............. | H04W 72/005 370/252 |
| 2013/0044614 A1 | 2/2013 | Aguirre | |
| 2013/0170424 A1 | 7/2013 | Anchan et al. | |
| 2013/0170818 A1 | 7/2013 | Klappert et al. | |
| 2013/0229974 A1 | 9/2013 | Xu et al. | |
| 2013/0251329 A1 | 9/2013 | McCoy et al. | |
| 2013/0258934 A1 | 10/2013 | Amerga et al. | |
| 2013/0258935 A1 | 10/2013 | Zhang et al. | |
| 2013/0294321 A1* | 11/2013 | Wang .................. | H04W 72/005 370/312 |
| 2013/0336173 A1 | 12/2013 | Mandil et al. | |
| 2014/0095668 A1 | 4/2014 | Oyman et al. | |
| 2014/0156800 A1 | 6/2014 | Falvo | |
| 2014/0169255 A1 | 6/2014 | Zhang et al. | |
| 2014/0192697 A1* | 7/2014 | Anchan ............... | H04W 72/005 370/312 |
| 2014/0286222 A1 | 9/2014 | Yu et al. | |
| 2014/0321826 A1 | 10/2014 | Stelmack et al. | |
| 2015/0009821 A1 | 1/2015 | Sridhar et al. | |
| 2015/0117323 A1* | 4/2015 | Hiben .................. | H04L 12/189 370/329 |
| 2015/0163379 A1 | 6/2015 | Herzog et al. | |
| 2016/0081070 A1 | 3/2016 | Li et al. | |
| 2016/0105894 A1 | 4/2016 | Lu et al. | |
| 2016/0211980 A1* | 7/2016 | Zhu ........................ | H04W 4/06 |
| 2016/0234570 A1 | 8/2016 | Van et al. | |
| 2016/0269189 A1 | 9/2016 | Xu et al. | |
| 2018/0263074 A1 | 9/2018 | Wang et al. | |
| 2019/0268197 A1 | 8/2019 | Al-Daher et al. | |

FOREIGN PATENT DOCUMENTS

| | | |
|---|---|---|
| CN | 102300168 A | 12/2011 |
| CN | 102379100 A | 3/2012 |
| CN | 102405665 A | 4/2012 |
| CN | 103535093 A | 1/2014 |
| CN | 103546477 A | 1/2014 |
| CN | 103797873 A | 5/2014 |
| CN | 103974198 A | 8/2014 |
| CN | 104105070 A | 10/2014 |
| CN | 104303545 A | 1/2015 |
| CN | 104540043 A | 4/2015 |
| CN | 104756587 A | 7/2015 |
| CN | 104954994 A | 9/2015 |
| CN | 105103575 A | 11/2015 |
| CN | 105684473 A | 6/2016 |
| EP | 1650989 A1 | 4/2006 |
| EP | 2086173 A1 | 8/2009 |
| EP | 2244502 A1 | 10/2010 |
| EP | 2244502 B1 | 6/2011 |
| EP | 2606662 A1 | 6/2013 |
| EP | 2775730 A1 | 9/2014 |
| EP | 2925003 A1 | 9/2015 |
| EP | 3125582 A1 | 2/2017 |
| GB | 2483125 A | 2/2012 |
| JP | 2013070841 A | 4/2013 |
| WO | WO-2009094744 A1 | 8/2009 |
| WO | WO-2012137078 A2 | 10/2012 |
| WO | WO-2012142428 A1 | 10/2012 |
| WO | WO-2013141874 A1 | 9/2013 |
| WO | WO-2014004787 A1 | 1/2014 |
| WO | WO-2014146617 A1 | 9/2014 |
| WO | WO-2015000912 A1 | 1/2015 |
| WO | WO-2015039888 A1 | 3/2015 |
| WO | WO-2015061983 A1 | 5/2015 |
| WO | WO-2015062443 A1 | 5/2015 |
| WO | WO-2015069407 A1 | 5/2015 |
| WO | WO-2015071461 A1 | 5/2015 |
| WO | WO-2015080407 A1 | 6/2015 |
| WO | WO-2015103947 A1 | 7/2015 |
| WO | WO-2015166087 A2 | 11/2015 |
| WO | WO-2016029938 A1 | 3/2016 |
| WO | WO-2017089183 A1 | 6/2017 |
| WO | WO-2017167648 A1 | 10/2017 |
| WO | WO-2017167835 A1 | 10/2017 |
| WO | WO-2017167838 A1 | 10/2017 |
| WO | WO-2018001897 A1 | 1/2018 |
| WO | WO-2018024395 A1 | 2/2018 |

(56) References Cited

OTHER PUBLICATIONS

3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.
Catt, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
Catt, "Evaluation on Service Continuity for eMBMS," 3GPP Draft; R2-140138, 3rd Generation Partnership Project (3GPP), Mobile Competence Centre ; 650, Route Des Lucioles ; F-06921 Sophia-Antipolis Cedex; France, vol. RAN WG2, Feb. 9, 2014, retrieved from URL: http://www.3gpp.org/ftp/Meetings_3GPP_SYNC/RAN2/Docs/, 3 pages.
Catt, "Methods for Service Continuity Improvement due to UE Mobility," 3GPP Draft; R2-140141, 3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.
Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
Ericsson, "MBMS Service Continuity Aspects for Group Communication," 3GPP Draft; R2-140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
ETSI TS 103 286-2 VI.I.1 (May 2015), "Technical Specification; Digital Video Broadcasting (DVB), Companion Screens and Streams, Part 2: Content Identification and Media Synchronization," 650 Route des Lucioles F-06921 Sophia Antipolis Cedex, France, http://www.etsi.org/deliver/etsi_tsll03200103299/10328602/01.01.01_60/ts10328602v010101p.pdf, retrieved on Apr. 24, 2018, 166 pages.
European Search Report for Application No. 16163451.4, dated Sep. 28, 2016, 8 pages.
European Search Report for Application No. 16163458.9, dated Sep. 20, 2016, 11 pages.
European Search Report for Application No. 16172341.6, dated Jun. 14, 2017, 10 pages.
European Search Report for Application No. 16182850.4, dated Jan. 17, 2017, 7 pages.
European Search Report for Application No. EP15196875.7, dated May 19, 2016, 6 pages.
"HbbTV 2.0.2 Specification," HbbTV Association, Retrieved on Apr. 24, 2018 from https://www.hbbtv.org/wpcontent/uploads/2018/02/HbbTVv202 specification_2018 02_16.pdf, Feb. 16, 2018, 313 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Search Report and Written Opinion for Application No. PCT/EP2016/077747, dated Jan. 24, 2017, 12 pages.
International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/064946, dated Jul. 10, 2017, 13 pages.
International Search Report and Written Opinion for Application No. PCT/EP2017/065543, dated Jul. 24, 2017, 17 pages.
LG Electronics INC, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.
Prasad A., et al., "Enabling Group Communications for Public Safety in LTE-Advanced Networks," Journal of Network and Computer Applications, vol. 62, 2016, pp. 41-52.
Qualcomm Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Qualcomm "LTE Evolved Multimedia Broadcast Multicast Service (eMBMS) Technology Overview," Qualcomm Research, San Diego, Nov. 2012, 18 pages.
Small Cell Forum, "X2 Interoperability," Release Four, Document 059.04.01, www.smallcellforum.org, Jun. 2014, 29 pages.
European Search Report for Application No. 16176922.9, dated Nov. 23, 2016, 11 pages.
International Preliminary Report on Patentability for Application No. PCT/EP2016/077747, dated Jan. 18, 2018, 10 pages.
DVB Organization: "ts_102796v010301p_draft_23-non-etsi-branding.pdf", DVB, Digital Video Broadcasting, C/O EBU—17A Ancienne Route—CH-1218 Grand Saconnex, Geneva—Switzerland, Oct. 9, 2014 (Oct. 9, 2014), XP017845818.
ETSI TS 123.246 "Universal Mobile Telecommunication System (UMTS); LTE; Multimedia Broadcast/Multicast Service (MBMS); Architecture and Functional Description (Release 9)," V9.5.0 (Jun. 2010); the 3rd Generation Partnership Project, pp. 1-67.
Examination Report for Great Britain Application No. 1605519.6 dated Sep. 27, 2018, 4 pages.
Written Opinion of the International Preliminary Examining Authority for Application PCT/EP2017/065543, dated Jun. 1, 2018, 11 pages.
Wu, et al., "CloudMo V: Cloud-based Mobile Social TV," Retrieved on Apr. 24, 2018 from http://i.cs.hku.hk/~cwu/papers/ywutmm12.pdf, 2012, 12 pages.
Zte, "Service Continuity for Group Communication due to UE Mobility," 3GPP Draft; R2-140101, 3GPP TSG-RAN WG2#85, and Agenda Item: 7.6.3, Prague, Czech Republic, Feb. 10-14, 2014, 3 pages.
U.S. Appl. No. 16/085,328, filed Sep. 14, 2018, Inventor(s): MacKenzie et al.
U.S. Appl. No. 16/085,382, filed Sep. 14, 2018, Inventor(s): Al-Daher et al.
Application and Filing Receipt for U.S. Appl. No. 15/774,934, filed May 9, 2018, Inventor(s): Rennison et al.
U.S. Appl. No. 16/310,948, filed Dec. 18, 2018, Inventor(s): MacKenzie et al.
Examination Report; GB Application No. GB1609547.3, dated Aug. 20, 2019, 2 pages.
Examination Report: GB Application No. GB1605519.6, dated Jul. 5, 2019, 4 pages.

(56) References Cited

OTHER PUBLICATIONS

Application as filed for U.S. Appl. No. 16/310,948, filed Dec. 18, 2018, Inventor(s):Mackenzie., et al., 282 pages.
Combined Search and Examination Report under Section 17 and 18(3) for GB Application No. 1613477.7, dated Dec. 19, 2016, 5 pages.
Communication Pursuant to Article 94(3) EPC for Application No. 17713043.2, mailed on Feb. 11, 2021, 6 pages.
Examination Report for GB Application No. GB1611277.3, dated Jun. 26, 2019, 4 pages.
Examination Report for Great Britain Application No. 1521000.8 dated Nov. 27, 2017, 12 pages.
First Office Action for Chinese Application No. 201780040711.3, dated Aug. 4, 2020, 12 pages.
International Preliminary Report on Patentability for Application No. PCT/EP2017/064946, dated Feb. 14, 2019, 7 pages.
International Preliminary Report on Patentability for corresponding PCT Application No. PCT/EP2017/065543, dated Aug. 17, 2018, 29 pages.
Office Action for Chinese Application No. 201780015375.7, dated Sep. 29, 2020, 17 pages.
Office Action for Chinese Application No. 201780048245.3, dated Nov. 30, 2020, 9 pages.
Prasad A et al., "Enhancements for Enabling Point-to-Multipoint Communication Using Unlicensed Spectrum," May 1, 2018, 7 pages.
Prasad A., et al., "Enhancements for Enabling Point-to-Multipoint Communication Using Unlicensed Spectrum," Retrieved from https://www.reserachgate.net/publication/324783210, 2018, 7 pages.
Sharetechnote, "Multi Cell-Measurement in LTE," Nov. 28, 2019, 16 pages.
Zhang X., "LTE Optimization and Principle and Method," Jan. 2018, 47 pages.
Office Action for Chinese Application No. 201780015375.7, dated Jun. 3, 2021, 3 pages.
Application as filed for U.S. Appl. No. 16/318,553, filed Jan. 17, 2019, 9 pages, Inventor(s): Al-Daher et al.
Office Action for Chinese Application No. 201780015137.6, dated Jan. 29, 2022, 18 pages.
Office action for Chinese Application No. 201780020001.4, dated Aug. 9, 2022, 8 pages.

\* cited by examiner

UE eMBMS procedures

MOBILE COMMUNICATIONS NETWORK

CROSS-REFERENCE TO RELATED APPLICATION

The present application is a National Phase entry of PCT Application No. PCT/EP2017/057470, filed Mar. 29, 2017, which claims priority from EP Patent Application No. 16163458.9, filed Mar. 31, 2016, each of which is hereby fully incorporated herein by reference.

TECHNICAL FIELD

The present disclosure relates to mobile communication networks and to a base station for a mobile communications network.

BACKGROUND

Multimedia content, such as video playback, live streaming, online interactive gaming, file delivery and mobile TV, is seen as the key driver for data traffic demand on wireless cellular networks. Multimedia content to a large number of users can be distributed by unicast, broadcast and multicast. In the following, the term "multicast" is used to include "broadcast" and vice versa. Unicast is a dedicated bidirectional point-to-point link for transmission between the base station and one user mobile device. Evolved Multimedia Broadcast Multicast Service (eMBMS) is an LTE technique offering a specific broadcast bearer to deliver data content to multiple users over shared downlink resources, which is more efficient than dedicating a unicast bearer for each user. Multicast-broadcast single-frequency network (MBSFN) further improves spectral efficiency by dynamically forming a single frequency network, whereby a mobile terminal (in LTE, the eNodeB) can seamlessly receive the same content over eMBMS from multiple base stations within a MBSFN area. A single-frequency network comprises groups of adjacent eMBMS base stations at which the same signal is synchronized and broadcast simultaneously on the same MBSFN sub-carrier frequency. The combination of eMBMS transmission from multiple base stations in a MBSFN service area provides a degree of transmission robustness in the form of spatial transmit diversity and effectively eliminates internal cell edges. However, a problem exists in handling the transfer of a mobile terminal between different MBSFN areas and between MBSFN and reserved unicast cells. A similar a problem exists in handling the transfer of a mobile terminal between eMBMS cells. Seamless mobility of the mobile terminals across an LTE network with different MBSFNs is not supported in 3GPP, so that service interruption may result, i.e. due to delays at the cell-edges while the mobile terminal acquires information about the targeted area or cell. Service interruption may also result when a the mobile terminal moves from a MBSFN providing an eMBMS broadcast service to a MBSFN where the service in question is only available by unicast.

SUMMARY

The present disclosure accordingly provides, in a first aspect, a base station for communication with a plurality of mobile terminals in a mobile communications network, in which the base station comprises: a plurality of transmitters, in which each transmitter is configured to provide a transmit radio signal to a distinct space when compared to the other transmitters; in which a first transmitter is configured to provide to a first space, a transmit radio signal carrying a multicast service; in which a second transmitter is configured to provide to a second space, distinct from the first space, a transmit radio signal carrying a unicast service; and in which the second space shares a first boundary with the first space.

In this way mobile devices may be switched to unicast in a timely manner before transferring to be served by a different service, e.g. before the transferring from a multicast to a unicast sector in a sectored cell. In particular, the invention can enhance mobile terminal mobility for eMBMS services operating in MBSFN architectures so as to reduce service interruption when a mobile terminal moves between MBSFN areas or between eMBMS base stations.

According to an embodiment, the base station also comprises a processor configured to communicate with a mobile terminal over the multicast service via the first transmitter and to transfer communication with the mobile terminal to the unicast service via the second transmitter.

According to an embodiment, the base station also comprises a processor configured to: receive from the mobile terminal, indications of signal quality received at the mobile terminal from the transmitter serving the current, multicast service and indications of signal quality received at the mobile terminal from the transmitter serving the target, unicast service; compare the indications of signal quality and determining that the mobile terminal is to transfer communication with the base station from the first transmitter to the second transmitter; instruct the mobile terminal to switch from the multicast service to a unicast service; and subsequently; and subsequently instruct the mobile terminal to transition from the current, multicast transmitter to the target, unicast transmitter.

According to an embodiment, a third transmitter is configured to provide to a third space, distinct from the first and second spaces, a transmit radio signal carrying a second multicast service; in which the second space shares a second boundary with the third space.

According to an embodiment, the third space is part of a second MBSFN area.

According to an embodiment, the base station also comprises a processor configured to change the configuration of the transmitters according to load such that the number of transmitters providing a transmit radio signal carrying the unicast service is reduced when system load exceeds a threshold, in which the system load comprises at least one of the radio resource usage load at the base station and traffic levels on radio frequencies between the base station and the plurality of mobile terminals.

According to an embodiment, the base station also comprises a processor configured to change the configuration of the transmitters according to load such that the number of transmitters providing a transmit radio signal carrying the unicast service is increased when system load falls below a threshold, in which the system load comprises at least one of the radio resource usage load at the base station and traffic levels on radio frequencies between the base station and the plurality of mobile terminals.

According to an embodiment, the first space is part of a first MBSFN area.

The present disclosure accordingly provides, in a first aspect, a method for operating a base station for a mobile communications network, in which the base station is in communication with a plurality of mobile terminals through a plurality radio transmitters; in which the method comprises the base station: providing from each transmitter a transmit radio signal to a distinct space when compared to the other transmitters; providing from a first transmitter to a first space, a transmit radio signal carrying a multicast service; providing from a second transmitter to a second space, distinct from the first space, a transmit radio signal carrying a unicast service; communicating with a mobile terminal over the multicast service via the first transmitter; and transferring communication with the mobile terminal to the unicast service via the second transmitter.

According to an embodiment, the method comprises receiving from the mobile terminal, indications of signal quality received at the mobile terminal from the transmitter serving the current, multicast service and indications of signal quality received at the mobile terminal from the transmitter serving the target, unicast service; comparing the indications of signal quality and determining that the mobile terminal is to transfer communication with the base station from the first transmitter to the second transmitter; instructing the mobile terminal to switch from the multicast service to a unicast service; and subsequently instructing the mobile terminal to transition from the current, multicast transmitter to the target, unicast transmitter.

According to an embodiment, the method comprises changing the configuration of the transmitters according to load such that the number of transmitters providing a unicast transmit signal is reduced when system load exceeds a threshold, in which the system load comprises at least one of the radio resource usage load at the base station and traffic levels on communications radio frequencies between the base station and the plurality of mobile terminals.

According to an embodiment, the method comprises changing the configuration of the transmitters according to load such that the number of transmitters providing a unicast transmit signal is increased when system load falls below a threshold, in which the system load comprises at least one of the radio resource usage load at the base station and traffic levels on radio frequencies between the base station and the plurality of mobile terminals.

According to an embodiment, the first space is part of a first MBSFN area.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

Embodiments of this disclosure enhance mobile terminal mobility for eMBMS services operating in MBSFN architectures so as to reduce service interruption when a mobile terminal moves between MBSFN areas or between eMBMS cells. The disclosure relates to techniques that can enable service switching from broadcast to unicast when a mobile terminal is moving from being served by a base station within a first MBSFN area towards being served by a base station within another MBSFN area. In particular, embodiments of the disclosure can avoid service interruption by defining triggers for initiating switching eMBMS service for the mobile terminal from broadcast to unicast before the mobile terminal is transitioned to being served by a base station in another MBSFN area.

Embodiments of this disclosure have application to a mobile terminal traversing a sectored cell at the boundary between two MBSFN areas. In a sectored cell, a single base station uses multiple transmitters, each transmitter for providing service to a different sector to effectively enhance the signal qualities available to mobile terminals in the base station's coverage area. Each transmitter comprises a directional antenna to transmit signals in different directions. Embodiments of the disclosure use intra-cell mobility (i.e. handover or reselection between sectors). According to the disclosure, the sectors are configured so that particular forms of intra-cell mobility initiate switching the mobile terminal to unicast. The switch to unicast may be achieved when the mobile terminal transitions from a sector serving a multicast service (a multicast sector) into a sector serving a unicast service (a unicast sector).

According to an embodiment, sectors adjacent to multicast cells of other base stations within the same MBSFN area are operated serving a multicast service, while at least one further sector is operated serving a unicast service.

Embodiments of the disclosure use intra-cell mobility procedures in sectored cells located at MBSFN area boundaries. Intra-cell mobility is an internal procedure in which mobile terminals are transferred between antennas on the same base station, so that the mobile terminal is still served by the same base station (in LTE, the base station is known as an eNodeB). An antenna may consist of a number of antenna-elements forming an array that is configured for various transmission modes. Typically a sector will have one antenna. Different sector identifiers (PCI) are assigned to different sectors as part of a structured radio planning procedures. Since the mobile terminal will "handover" to the same base station, the procedure may be implemented within the base station that serves all the sectors of the cell. During intra-cell mobility, a mobile terminal in RRC idle mode will perform a reselection procedure to transition into a unicast sector where it could then switch to RRC connected mode in order to receive unicast services. A mobile terminal that is in RRC connected mode prior to an intra-cell mobility transition will follow normal handover procedures to transition into a unicast sector.

When a mobile terminal using multicast moves out of an MBSFN area into another MBSFN area or to a cell that does not provide the required MBMS service, then service interruption may be expected. For mobility between MBSFN areas, there is anticipated to be a service interruption of around 1.5 seconds. This is a combination of mobility time plus the time to read SIBs of the new serving cell (see FIG. 3). For mobility to a non-MBSFN cell the interruption is anticipated to be around 0.5 seconds. This includes time to read the SIBs of the new serving cell and then to setup a unicast bearer. Switching a mobile terminal from a multicast service to a unicast service reduces service interruption when moving out of an MBSFN area (whether moving into another MBSFN area or to a non-MBSFN cell). Where the switch to unicast occurs while the mobile terminal is still receiving good coverage of its serving base station, then the switch to unicast should further reduce service interruption.

For example minimal interruptions may result from an increased likelihood of achieving make-before-break service continuity from multicast to unicast and a reduced likelihood of random failure of an access frequency (which can adversely affect initial call setup step and registration). Where a base station takes responsibility for managing the transition of a mobile terminal that is moving out of an MBSFN area to a different MBSFN area, it can appropriately manage the timing of a transition from multicast to unicast. This removes risk of service interruptions for mobile terminals entering a different MBSFN area (as service interruption for switching from unicast to multicast can be zero).

Figure 1:
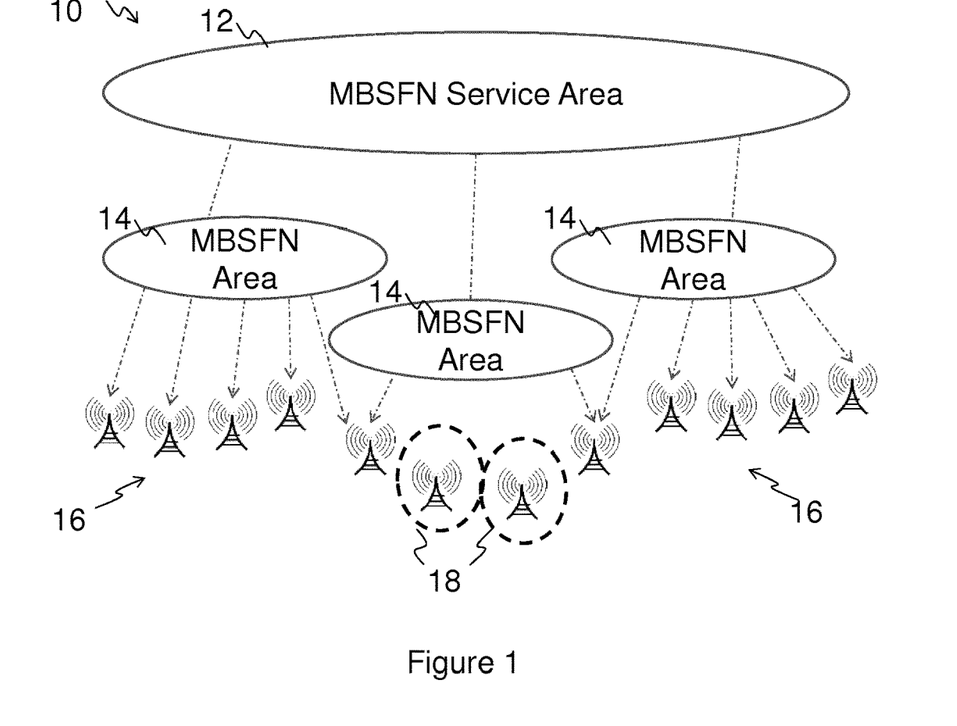
FIGS. 1 and 2 show a conventional 3GPP mobile communications network.

In Evolved Universal Terrestrial Radio Access Network (E-UTRAN), eMBMS services may be provisioned by defining MBSFN areas within a geographical area designated for broadcast (or multicast) services. A broadcast service area could be a single cell or multiple cells. A multi-cell MBSFN area defines a set of base stations participating in MBSFN service modes. FIG. 1 illustrates a MBSFN network structure. Within MBSFN network 10, an operator operates a MBSFN service area 12 for deploying a broadcast (or multicast) service. Within that service area there may be a plurality of MBSFN areas 14. Each MBSFN area 14 consists of a number of base stations 16, each serving a different cell (not shown). The base stations 16 in a particular MBSFN area 14 are capable of synchronizing together to provide the MBSFN service across multiple cells in the MBSFN area. Some of the base stations 16 within the MBSFN areas 14, serve reserved cells 18. A MBSFN area reserved cell is a cell within a MBSFN area that does not contribute to the MBSFN transmission and may be used for other services, e.g. unicast. Within a MBSFN area, eMBMS can be provided over a single frequency layer dedicated to MBSFN transmission or over a single frequency layer that is shared between MBSFN transmission and unicast services. Where Radio Resource Control (RRC) is used, reception of eMBMS services is available for the mobile terminals in RRC_Connected or RRC_Idle states.

LTE supports overlap between MBSFN service areas, for example, smaller MBSFN areas can overlap larger ones for regional and national coverage. In 3GPP LTE or 4G, one base station can belong to up to eight MBSFN areas. All base stations transmitting MBSFN in a single area are required to be synchronized, so that the same multimedia content is transmitted from all the base station stations with a mutual offset of no more than a few micro-seconds.

Figure 2:
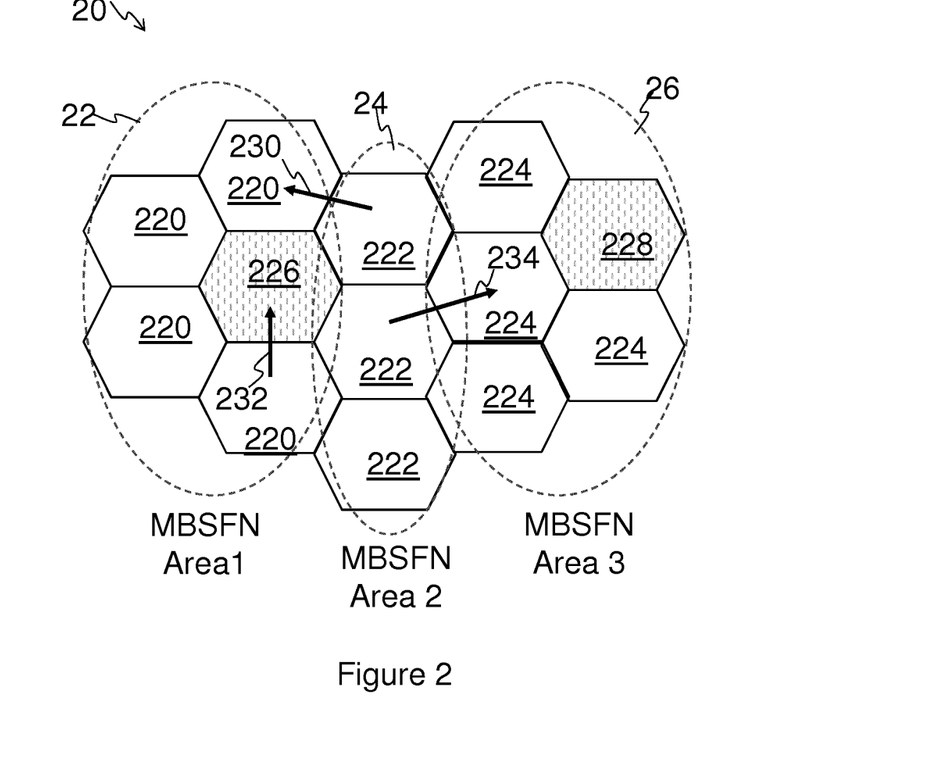

One of the key features of the LTE network is mobility provision. Supporting seamless user mobility across the network requires service continuity for eMBMS users and plays an important role in maintaining service quality and customer satisfaction. There are a number of scenarios where it would be desirable for a LTE mobile terminal to be able to move from one base station to another whilst receiving MBSFN service, for example when a the mobile terminal is moving into a MBSFN area reserved cell whilst receiving an eMBMS service and when moving from one MBSFN cell to another cell not within the same MBSFN area. FIG. 2 shows MBSFN service area 20 comprising exemplary MBSFN areas 22, 24 and 26—each MBSFN area comprising a plurality of cells, each cell defined by a different base station (not shown). MBSFN area 22 comprises a plurality of multicast cells 220 and one MBSFN area reserve (unicast) cell 226. MBSFN area 24 comprises a plurality of multicast cells 222 but no MBSFN area reserve (unicast) cell. MBSFN area 26 comprises a plurality of multicast cells 224 and one MBSFN area reserve (unicast) cell 228. Exemplary transitions between the cells of MBSFN service area 20 are shown, as follows. Transitions 230 and 234 represent a mobile terminal passing from one multicast cell to another multicast cell in a different MBSFN area. Transition 232 represents a mobile terminal passing from a multicast cell to an MBSFN area reserved cell in the same MBSFN area. 3GPP standards do not describe any mechanism for switching a mobile terminal that is receiving a multicast service from multicast to unicast.

Embodiments will now be described based on utilizing intra-cell mobility procedures at the boundaries of a MBSFN area to transition a mobile terminal from multicast to unicast.

Figure 4A:
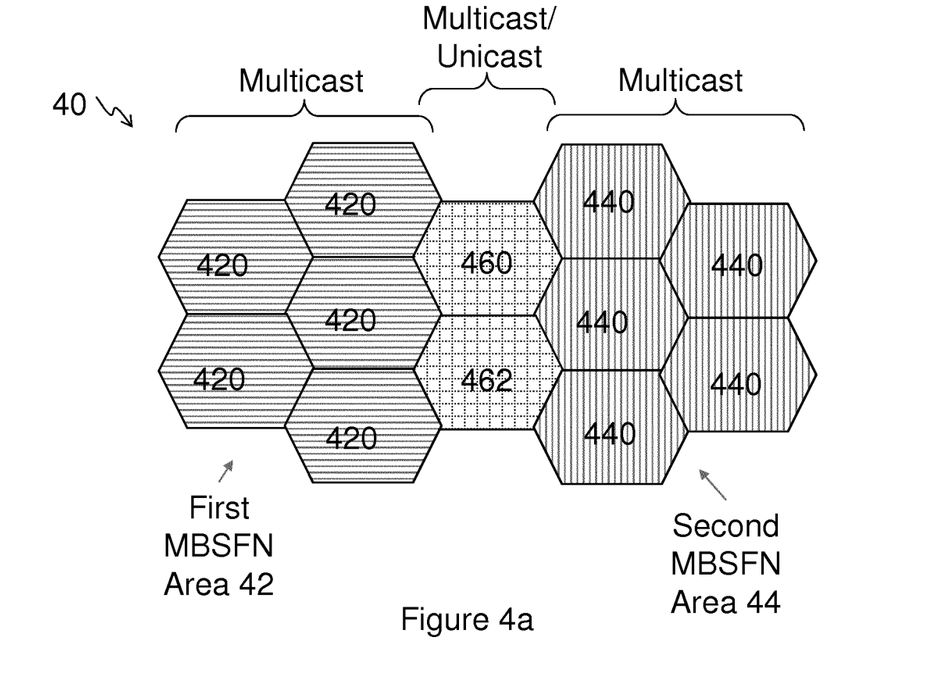
FIGS. 4a, 4b and 4c show a mobile communications network according to an embodiment of the disclosure.

FIG. 4a shows a mobile communications network, by way of example, a LTE network 40 compromising a first MBSFN area 42 comprising cells 420 and a second MBSFN area 44 comprising cells 440. First MBSFN area 42 and second MBSFN area 44 overlap at cells 460 and 462, which form part of both first and second MBSFN areas. Shared cells 460, 462 are sectored cells and are divided between various sectors, which may be unicast or multicast and where individual sectors may belong to different MBSFN areas. The other cells 420, 440 in first MBSFN area 42 and second MBSFN area 44 are multicast. First MBSFN area 42 therefore comprises multicast cells 420 together with some sectors from cells 460, 462 and serves a first eMBMS service. Second MBSFN area 44 comprises multicast cells 440 together with some sectors from cells 460, 462 and serves a second eMBMS service.

Figure 4B:
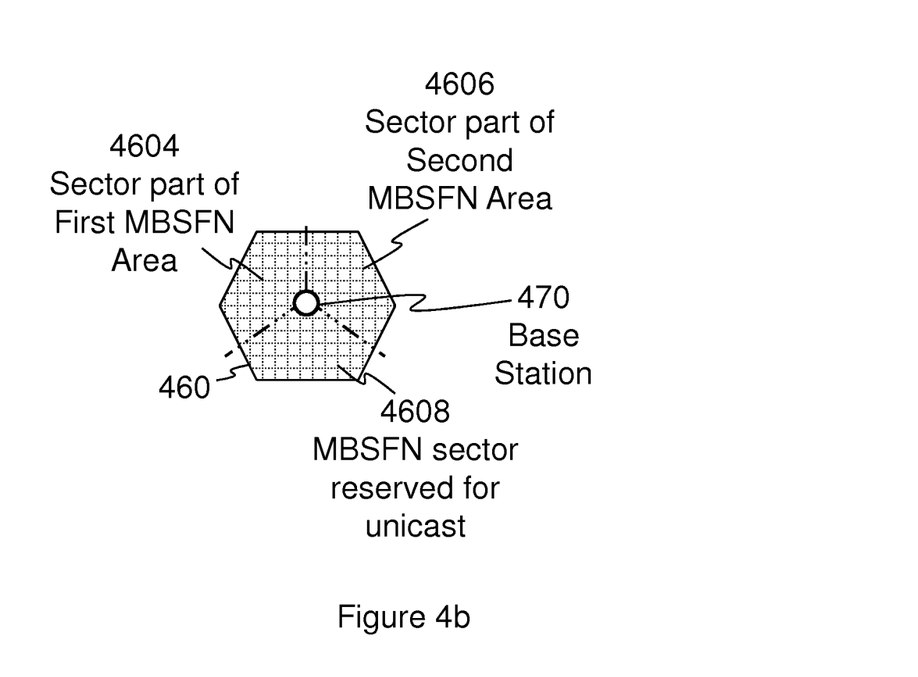
Figure 4C:
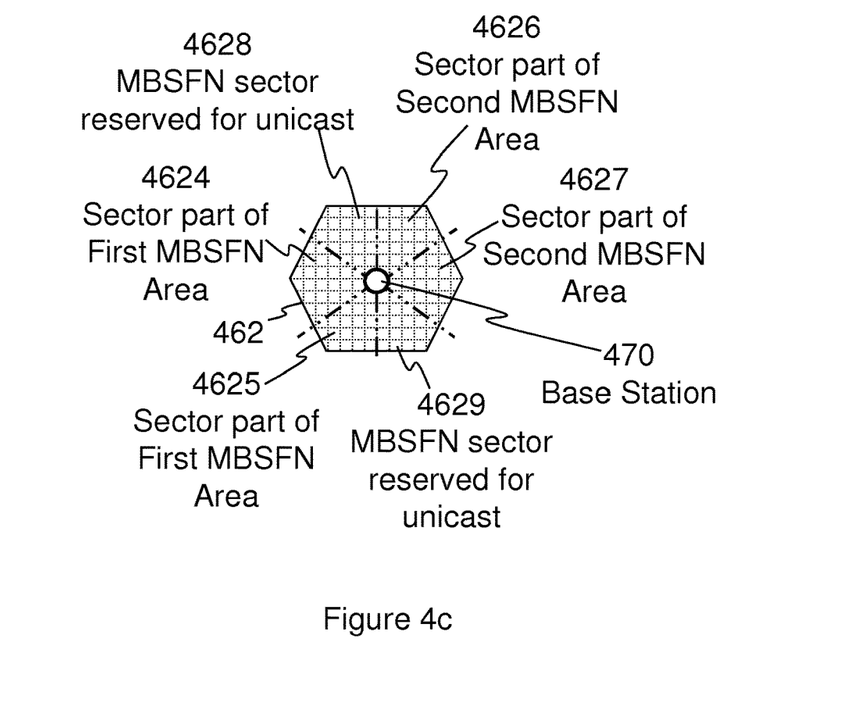

In FIG. 4a, cells 460 and 462 in the overlapping regions between MBSFN areas will have one or more sectors (e.g. sectors 4608, 4628 and 4629 as shown in FIGS. 4b and 4c) reserved for unicast service.

FIGS. 4b and 4c show sectored cell 460 in more detail according to further embodiments of the disclosure.

FIG. 4b shows an example embodiment of sectored cell 460 comprising three sectors. Each cell comprises a base station, although only base station 770 in cell 460 is shown. As shown in FIG. 4b, sector 4608 is a unicast sector, while sectors 4604 and 4606 are multicast sectors. Multicast sector 4604 forms part of a first MBSFN area 42 while multicast sector 4606 forms part of second MBSFN area 44. Unicast sector 4608 does not form part of either MBSFN areas 42, 44. The transition of a mobile terminal between sectors in a cell is known as "handover" for mobile terminals in RRC connected mode and as "reselection" for mobile terminals in RRC idle mode. The switch to a unicast service is triggered by the base station 770 prior to the mobile terminal transitioning into the unicast sector, i.e. prior to the point of handover for RRC connected mobile terminals and the point of reselection for RRC idle mode mobile terminals. For example, a mobile terminal in multicast sector 4604 (which is part of first MBSFN area 42) targeting sector 4608 (which is a unicast sector) will switch to unicast prior to intra-cell transition to target sector 4608.

When a mobile terminal, which has switched to unicast while being served by multicast sector 4604, moves into unicast sector 4608, standard mobility techniques can be used for the mobile terminal to transition (i.e. handover or reselect) to sector 4608 while maintaining its unicast service. Advantageously, according to embodiments of the disclosure, the transition from the multicast sector to the unicast sector occurs through the mechanism of intra-cell mobility where there is a reduced risk of service discontinuity. According to embodiments of the disclosure, the different sectors of the cell are appropriately configured for unicast or multicast services. By providing different services on different sectors, the switch to unicast may simply be triggered by the sectored cell base station for a mobile terminal traversing the sectored cell.

Referring again to FIG. 4b, when base station 470 detects a mobile terminal in a multicast sector (sector 4604, for example) approaching the boundary of a unicast sector (sector 4608, for example), base station 470 will trigger switching to unicast and, subsequently, intra-cell transition. According to an embodiment, the boundary between multicast sector 4604 and the unicast sector 4608 coincides with a boundary of the first MBSFN area 42.

Intra-cell transition is triggered by comparing the signal quality received at the mobile terminal from the antenna serving the current, multicast sector with that received at the mobile terminal from the antenna serving the target, unicast antenna. Switching to unicast service is triggered by the base station taking a decision that a transition to the unicast antenna is required and instructing the mobile terminal to switch to unicast prior to the transition. The antenna serving the current, multicast sector is capable of multiplexing both multicast and unicast services. On receiving from the base station the instruction to switch to unicast, the mobile terminal changes to communicate using unicast transmission with the antenna serving the current, multicast sector. Subsequently, on receiving from the base station the instruction to transition to the unicast antenna, the mobile terminal starts to receive unicast service from the unicast antenna rather than from the multicast antenna.

FIG. 4c shows an example embodiment of sectored cell 460 comprising six sectors, although, it will be appreciated that embodiments of the disclosure may equally be implemented using different numbers of sectors per base station and different proportions of multicast to unicast sectors. As shown in FIG. 4c, sectors 4628 and 4629 are unicast, while sectors 4624, 4625, 4626 and 4627 are multicast. Multicast sectors 4624, 4625 form part of first MBSFN area 42 while multicast sectors 4626, 4627 form part of second MBSFN area 44. Unicast sectors 4628 and 4629 do not form part of either MBSFN areas 42, 44. Referring to FIG. 4c, where base station 470 detects a mobile terminal in a multicast sector (sector 4625, for example) approaching the boundary of a unicast sector (sector 4628, for example) base station 470 will trigger the switch to unicast and, subsequently, the intra-cell transition (i.e. between sectors).

As previously discussed, intra-cell transition is triggered by comparing the signal quality received at the mobile terminal from the antenna serving the current, multicast sector (sector 4625, for example) with that received at the mobile terminal from the antenna serving the target, unicast sector (sector 4628, for example). Switching to unicast service is triggered by the base station on deciding that a transition to the unicast antenna is required and instructing the mobile terminal to switch to unicast prior to the transition.

According to an embodiment, the boundary between at least one multicast sector and the unicast sector coincides with a boundary of the MBSFN area.

According to a dynamic implementation embodiment, the rate of transfer of the mobile terminals from multicast to unicast sectors may be regulated so as to control the system load (since unicast places a higher load), where the system load comprises at least one of the radio resource usage load at the base station and traffic levels on communications frequencies between the base station and the plurality of mobile terminals. In particular, the number of unicast sectors in the cell can be adjusted to control the rate of switching mobile terminals from multicast to unicast. With dynamic implementation the number of unicast sectors served by a base station is variable. When there is sufficient capacity, the number of unicast sectors served by a base station may be increased by reconfiguring the base station. Increasing the number of unicast sectors per base station will tend to increase the fraction of the mobile terminals served by each base station over unicast. When there is insufficient capacity, the number of unicast sectors served by a base station may be decreased by reconfiguring the base station. Decreasing the number of unicast sectors per base station will tend to decrease the fraction of the mobile terminals served by each base station over unicast. The dynamic option provides the base station with the flexibility to increase the efficacy of the invention, by having more unicast sectors when capacity is available but also to reduce the overhead associated with embodiments of the disclosure by decreasing the number of unicast sectors where necessary.

Figure 3:
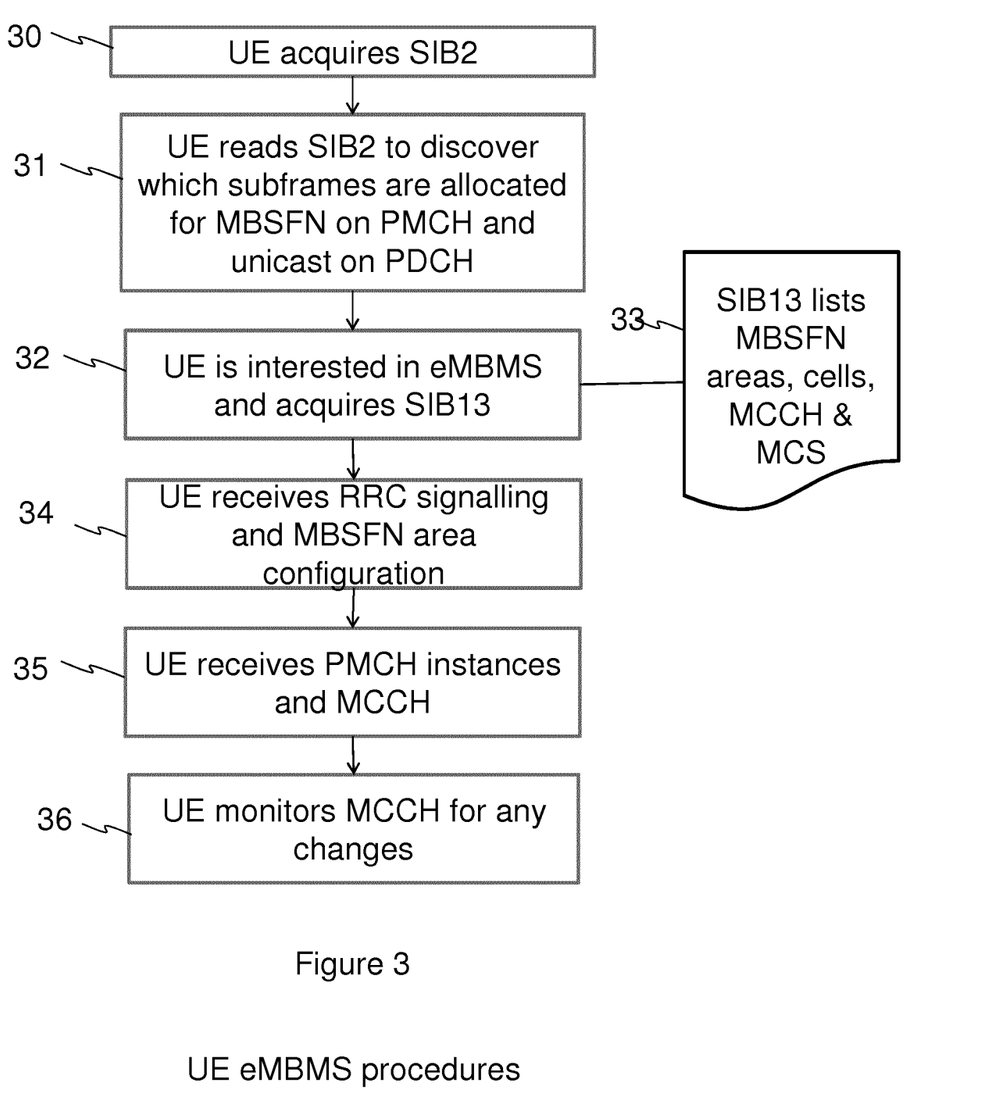
FIG. 3 shows a sequence of events according to an embodiment of the disclosure.

With reference to FIG. 3, at 30, the mobile terminal acquires from the serving base station a system information block type 2 (SIB2) containing radio resource configuration information that is common for all the mobile terminals. At 31, the mobile terminal reads SIB2 to discover which sub-frames are allocated for MBSFN on PMCH and unicast on PDCH. At 32, the mobile terminal, being interested in eMBMS, acquires SIB13, which contains information required to acquire the MBMS control information associated with one or more MBSFN areas. For example, SIB13 lists: MBSFN areas, cells, MCCH and MCS. At 34, the mobile terminal receives from the base station RRC signaling and MBSFN area configuration information and, at 35, the mobile terminal receives PMCH instances and MCCH. At 36, the mobile terminal monitors MCCH for any changes.

3GPP Release 12 has introduced a Group Communication Server Application Server (GCS AS). The GCS AS function is to signal to the mobile terminal the required configuration information that the mobile terminal needs in order to receive application data via eMBMS bearer services. As the mobile terminal detects it is moving away from the MBSFN area, for example by detecting a poor MBSFN signal quality or by monitoring one of the other parameters, listed above, it elects to receive data over unicast whilst it is still able to communicate effectively with the serving MBMS cell. The mobile terminal sets up a unicast flow to receive eMBMS data via unicast and, accordingly, ceases receiving eMBMS data via MBSFN. The mobile terminal is able to receive the eMBMS data from unicast and MBMS simultaneously thereby avoiding service interruption during this switching process. At a later time, the mobile terminal notifies the GCS AS that it is approaching the limit of communicating effectively with the serving MBSFN cell and will soon be too far from the serving MBMS cell to guarantee reliable operation and so initiates transition to a cell that is able to provide the mobile terminal with a stronger signal.

Switching from unicast delivery to eMBMS is also possible if the mobile terminal happens to enter an adjacent MBSFN area. The mobile terminal has ongoing communications with GCS AS, which will inform the mobile terminal when eMBMS delivery is available over MBSFN—along with the corresponding bearer service configurations. Whilst the mobile terminal is still receiving downlink unicast delivery, when eMBMS delivery becomes available over MBSFN, the mobile terminal can start receiving MBMS scheduling information over MCH and eMBMS bearer over MTCH. During this switching period, the mobile terminal will receive the eMBMS data from both unicast and MBMS. The mobile terminal will then notify the GCS AS that it is within the adjacent MBSFN area and that it is receiving eMBMS bearer service. The GCS AS will then stop the unicast delivery to the mobile terminal, which now will only receive services over MBSFN.

Figure 5:
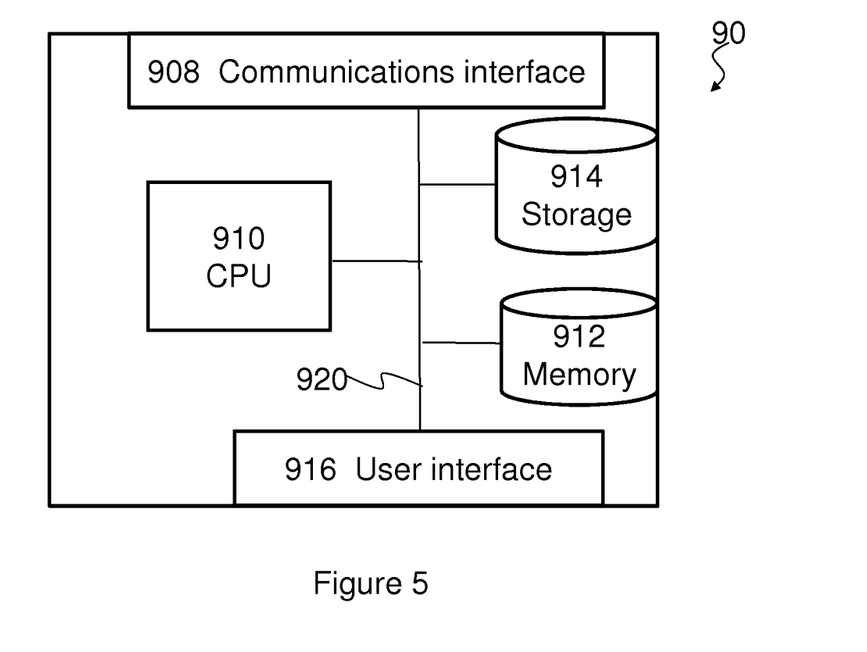
FIG. 5 is a block diagram of a computer system suitable for the operation of embodiments of the present disclosure.

FIG. 5 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Embodiments of the disclosure have application to audio and video broadcasting but also file broadcasting in mobile networks. In addition to mobile networks, the present invention may also have application to femtocell and small cell deployments, for example, in pre-loading certain content on devices to enhance QoE and optimize use of resources. Similar scenarios may arise for simultaneous software updates on multiple devices. Embodiments of the disclosure have been described in an LTE context that could be deployed with existing multicast mobile networks, but embodiments can be applied in any multicast mobile network where the network elements have similar roles regarding unicast and multicast service provision.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention. The invention is not limited to the use of intra-cell mobility procedures in sectored cells located at MBSFN area boundaries but also in sectored cells at other locations where switching to unicast prior to transitioning to a different cell may reduce or avoid service interruption.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A base station for communication with a plurality of mobile terminals in a mobile communications network, the base station comprising:
   a plurality of transmitters, each transmitter configured to provide a transmit radio signal to a distinct sector space when compared to the other transmitters, wherein each distinct sector space is configured for either multicast service or unicast service;
   wherein a first transmitter of the plurality of transmitters is configured to provide, to a first sector space configured for multicast service, a transmit radio signal carrying a first multicast service;
   wherein a second transmitter of the plurality of transmitters is configured to provide, to a second sector space configured for unicast service and distinct from the first sector space, a transmit radio signal carrying a unicast service; and
   wherein the second sector space shares a first boundary with the first sector space such that the first sector space only shares the first boundary with distinct sector spaces of the plurality of transmitters that are configured for unicast service.

2. The base station of claim 1, further comprising a processor configured to communicate with a mobile terminal over the first multicast service via the first transmitter and to transfer communication with the mobile terminal to the unicast service via the second transmitter.

3. The base station of claim 1, further comprising a processor configured to:
   receive, from the mobile terminal, first indications of signal quality received at the mobile terminal from the first transmitter serving the first multicast service and second indications of signal quality received at the mobile terminal from the second transmitter serving the unicast service;
   compare the first indications and the second indications of signal quality and determine that the mobile terminal is to transfer communication with the base station from the first transmitter to the second transmitter;
   instruct the mobile terminal to switch from the first multicast service to the unicast service; and subsequently
   instruct the mobile terminal to transition from the first transmitter to the second transmitter.

4. The base station of claim 1, wherein a third transmitter of the plurality of transmitters is configured to provide, to a third sector space distinct from the first sector and the second spaces sector, a transmit radio signal carrying a second multicast service, in which the second sector space shares a second boundary with the third sector space.

5. The base station of claim 4, wherein the third sector space is part of a second multicast-broadcast single-frequency network (MBSFN) area.

6. The base station of claim 1, further comprising a processor configured to change a configuration of the plurality of transmitters according to system load such that a number of the plurality of transmitters providing a transmit radio signal carrying the unicast service is reduced when the system load exceeds a threshold, in which the system load comprises at least one of a radio resource usage load at the base station and traffic levels on radio frequencies between the base station and the plurality of mobile terminals.

7. The base station of claim 1, further comprising a processor configured to change a configuration of the plurality of transmitters according to system load such that a number of the plurality of transmitters providing a transmit radio signal carrying the unicast service is increased when the system load falls below a threshold, in which the system load comprises at least one of a radio resource usage load at the base station and traffic levels on radio frequencies between the base station and the plurality of mobile terminals.

8. The base station of claim 1, wherein the first sector space is part of a first multicast-broadcast single-frequency network (MBSFN) area.

9. A method for operating a base station for a mobile communications network, in which the base station is in communication with a plurality of mobile terminals through a plurality radio transmitters, wherein the method comprises, by the base station:
providing from each of the plurality of radio transmitters a transmit radio signal to a distinct sector space when compared to the other radio transmitters, wherein each distinct sector space is configured for either multicast service or unicast service;
providing from a first radio transmitter of the plurality of radio transmitters to a first sector space configured for multicast service, a transmit radio signal carrying a multicast service;
providing from a second radio transmitter of the plurality of radio transmitters to a second sector space, configured for unicast service and distinct from the first sector space, a transmit radio signal carrying a unicast service, wherein the second sector space shares a first boundary with the first sector space such that the first sector space only shares the first boundary with distinct sector spaces of the plurality of radio transmitters that are configured for unicast service;
communicating with a mobile terminal over the multicast service via the first radio transmitter; and
transferring communication with the mobile terminal to the unicast service via the second radio transmitter.

10. The method of claim 9, further comprising:
receiving, from the mobile terminal, first indications of signal quality received at the mobile terminal from the first radio transmitter serving the multicast service and second indications of signal quality received at the mobile terminal from the second radio transmitter serving the unicast service;
comparing the first and second indications of signal quality and determining that the mobile terminal is to transfer communication with the base station from the first radio transmitter to the second radio transmitter;
instructing the mobile terminal to switch from the multicast service to the unicast service; and subsequently
instructing the mobile terminal to transition from the first radio transmitter to the second radio transmitter.

11. The method of claim 9, further comprising changing a configuration of the plurality of radio transmitters according to system load such that a number of the plurality of radio transmitters providing a unicast transmit signal is reduced when the system load exceeds a threshold, wherein the system load comprises at least one of a radio resource usage load at the base station and traffic levels on communications radio frequencies between the base station and the plurality of mobile terminals.

12. The method of claim 9, further comprising changing a configuration of the plurality of radio transmitters according to system load such that a number of transmitters providing a unicast transmit signal is increased when system load falls below a threshold, wherein the system load comprises at least one of a radio resource usage load at the base station and traffic levels on radio frequencies between the base station and the plurality of mobile terminals.

13. The method of claim 9, wherein the first sector space is part of a first multicast-broadcast single-frequency network (MBSFN) area.

14. A non-transitory computer-readable storage medium storing a computer program element comprising computer program code to, when loaded into a computer system and executed thereon, cause the computer to perform the method as claimed in claim 9.

* * * * *

UNITED STATES PATENT AND TRADEMARK OFFICE
CERTIFICATE OF CORRECTION

| | | |
|---|---|---|
| PATENT NO. | : 11,589,269 B2 | |
| APPLICATION NO. | : 16/085257 | |
| DATED | : February 21, 2023 | |
| INVENTOR(S) | : Richard Mackenzie et al. | |

It is certified that error appears in the above-identified patent and that said Letters Patent is hereby corrected as shown below:

In the Specification

In Column 1, Line 54, delete "a the" and insert -- the --.
In Column 2, Line 65, after "plurality" insert -- of --.
In Column 5, Line 55, delete "a the" and insert -- the --.

In the Claims

In Column 11, Line 19, in Claim 9, after "plurality" insert -- of --.

Signed and Sealed this
Ninth Day of April, 2024

*Katherine Kelly Vidal*

Katherine Kelly Vidal
*Director of the United States Patent and Trademark Office*